(12) United States Patent
Sethi et al.

(10) Patent No.: US 9,657,904 B1
(45) Date of Patent: May 23, 2017

(54) PHOTOBLEACHING DISPLAYS TO MITIGATE COLOR GRADIENTS

(71) Applicant: Amazon Technologies, Inc., Seattle, WA (US)

(72) Inventors: Guneet Sethi, Fremont, CA (US); Nhi A. Duong, San Jose, CA (US); Tin Quang Pham, San Jose, CA (US); Heather Kulani Coursey, San Jose, CA (US); Weihsin Hou, Fremont, CA (US); Robert L. D. Zenner, San Jose, CA (US); Saket Patil, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/628,565

(22) Filed: Feb. 23, 2015

Related U.S. Application Data

(60) Provisional application No. 62/080,074, filed on Nov. 14, 2014.

(51) Int. Cl.
 *G02F 1/01* (2006.01)
 *F21K 9/00* (2016.01)
 *F21V 8/00* (2006.01)

(52) U.S. Cl.
 CPC .............. *F21K 9/00* (2013.01); *G02B 6/0073* (2013.01)

(58) Field of Classification Search
 CPC ........... G02F 1/133617; G06F 15/0291; G06F 17/242; G09G 2380/14; G09G 5/028; B01J 19/123
 See application file for complete search history.

(56) References Cited

U.S. PATENT DOCUMENTS

| | | | | |
|---|---|---|---|---|
| 3,635,806 A | * | 1/1972 | Heckert | ..................... C08J 3/28 510/476 |
| D312,276 S | * | 11/1990 | Fisherman | ..................... D19/26 |
| 5,558,735 A | * | 9/1996 | Rettew | ..................... B32B 7/12 156/275.5 |
| 6,559,826 B1 | * | 5/2003 | Mendelson | ......... G09G 3/2092 345/102 |

(Continued)

OTHER PUBLICATIONS

Cathleen Baker ("Practical Methods for Sun and Artificial Light Bleaching Paper," The Book and Paper Group, Annual Proceedings, vol. 1).*

(Continued)

*Primary Examiner* — Brooke Purinton
(74) *Attorney, Agent, or Firm* — Lee & Hayes, PLLC

(57) ABSTRACT

Technologies are described herein for photobleaching a display. A display may be photobleached by exposing the display to light emitted by an external lamp and/or may be photobleached using one or more display lights of the electronic device during a burn-in period. In some examples, the light emitted by the lamp is filtered to remove wavelengths below a certain wavelength. The light that is received by the display from the lamp may include wavelengths between about 310 nm and 700 nm. These wavelengths correspond to visible light and near-visible light. The display may be exposed to the light for some duration or until some dose of light is received by the display. In other configurations, a burn-in period is performed for about eighteen hours.

14 Claims, 8 Drawing Sheets

(56) References Cited

U.S. PATENT DOCUMENTS

| | | | | |
|---|---|---|---|---|
| 2007/0273956 A1* | 11/2007 | Kim | ............. | G02F 1/167 359/296 |
| 2010/0266445 A1* | 10/2010 | Campagna | ............. | A61L 2/10 422/23 |
| 2012/0237873 A1* | 9/2012 | Fujiwara | ............. | C08G 77/14 430/280.1 |
| 2012/0327345 A1* | 12/2012 | Inoue | ............. | C03C 17/32 349/123 |
| 2015/0274761 A1* | 10/2015 | Sagisaka | ............. | C09K 9/02 359/273 |

OTHER PUBLICATIONS

R. Voelkel, U. Vogler, A. Bich, P. Pernet, K. J. Weible, M. Hornung, R. Zoberbier, E. Cullmann, L. Stuerzebecher, T. Harzendorf, and U. D. Zeitner, "Advanced mask aligner lithography: New illumination system," Opt. Express18(20), 20968-20978 (2010). [CrossRef] [PubMed].*

* cited by examiner

PHOTOBLEACHING DISPLAYS TO MITIGATE COLOR GRADIENTS

CROSS-REFERENCE TO RELATED APPLICATIONS

This application claims the benefit of provisional U.S. patent application No. 62/080,074, filed on Nov. 14, 2014, and entitled "Photobleaching of Display Stacks to Mitigate Color Gradients", which is expressly incorporated herein by reference in its entirety

BACKGROUND

People use electronic devices for a variety of purposes, such as making telephone calls, texting, accessing the Internet, sending and receiving email, viewing movies and television shows, playing music, reading electronic books, playing games, navigation, and numerous other functions. These devices may include the ability to present various types of information and images, such as user interfaces, digital content items, such as electronic books, and the like, depending on the kind and purpose of the device.

The appearance and quality of a display can affect a user's experience with the electronic device and the content presented by the device. For example, some types of devices may have visual imperfections that degrade the user's experience. Accordingly, finding ways to enhance user experience and satisfaction continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
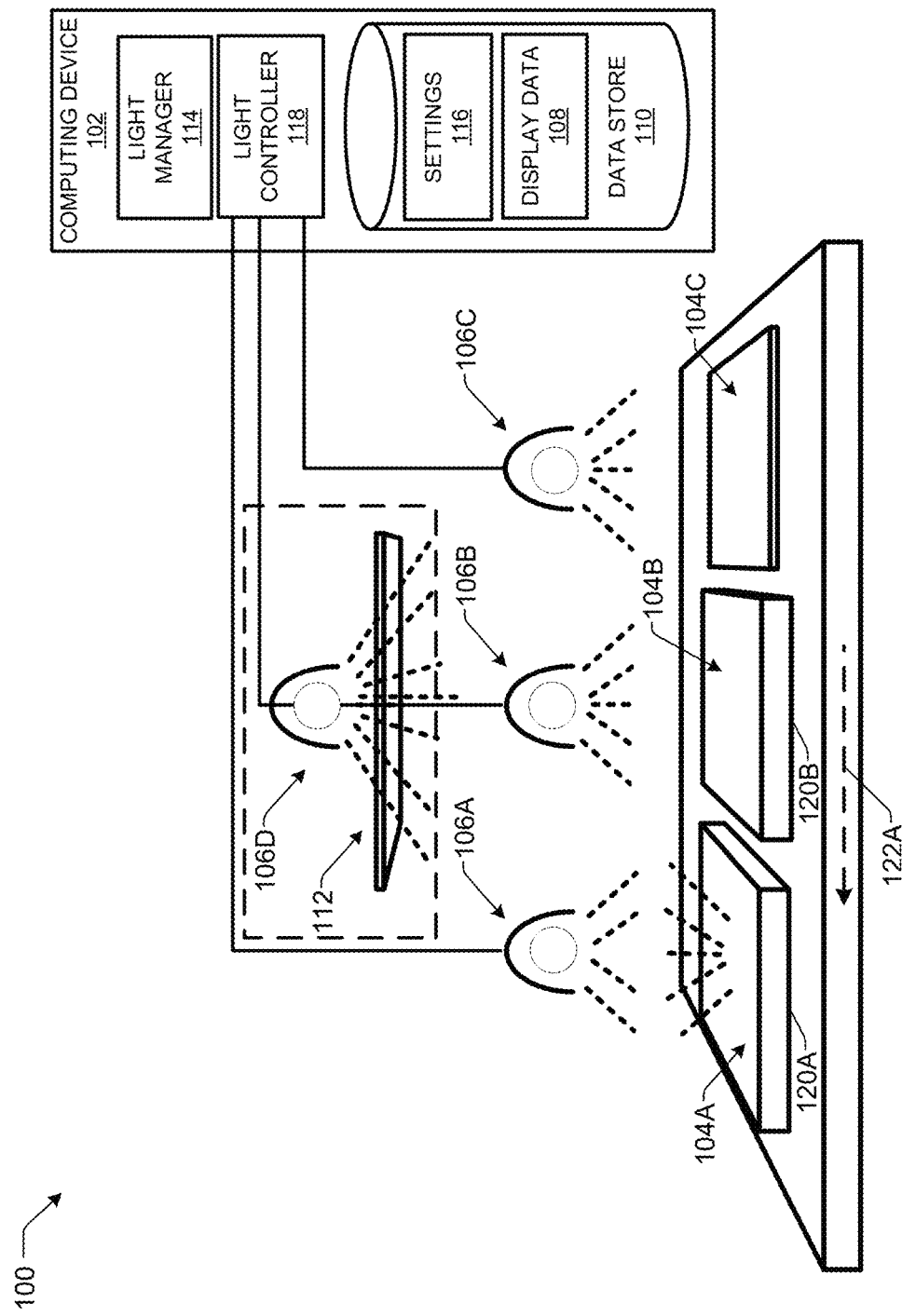
FIG. 1 is a system diagram showing an illustrative environment for photobleaching displays to reduce color gradients.

The following detailed description is directed to technologies for photobleaching displays to mitigate color gradients. Utilizing the technologies described herein, a display is exposed to a light source to reduce color gradients that may be associated with the display.

For example, a display may be photobleached to reduce the appearance of "yellow" color gradients. A color might be more visible in one portion of the display as compared to another portion of the display. In some cases, it has been found that a portion of the display that appears more yellow is positioned farther from the display lights used to illuminate the display compared to the other portions of the display that do not appear to be as yellow. In some configurations, and as discussed in more detail below, a light guide is used to propagate light received from the display lights to the display.

The variation in the color throughout the display may be visually distracting to a user. When color values of different points on the display are measured, there may be a larger delta between some points of the display as compared to other points of the display. The portions of the screen that include the larger deltas between the points of the display may be more distracting to the user.

In some configurations, to reduce the color gradients (e.g., the yellow color gradients) exhibited by the display, the display is exposed to a light source for some period of time. The light source may a lamp, such as a mercury vapor bulb, that emits visible light and near-visible light. In some configurations, the light emitted by the light source is filtered to remove some of the wavelengths.

For example, the light emitted by a lamp may be filtered to create UV light and visible light that includes the wavelengths between about 310 nanometers (nm) and 700 nm. A glass sheet, or some other filter, that is placed between the lamp and the display, may filter the lamp. In other examples, the light source might produce the wavelengths without filtering (e.g., one or more LED light sources). In some configurations, a filter might be used to limit the amount of light that is received by the display.

The display may be positioned at some specified distance below the light source to help in controlling the intensity of the light received by the display. In some configurations, the display is positioned such that the portion of the display that is most affected by the color gradients is exposed to the peak intensity of the light source. For instance, the portion of the display that more prominently exhibits the undesired color (e.g., yellow) might be positioned to receive higher intensity light as compared to the other portions of the screen.

According to some configurations, the display is exposed to the light emitted by the light source until the portions of the display that are being photobleached receive a specified radiant exposure (dose). As used herein, the term "radiant exposure" or "dose" or "dosage" may refer to an amount of light per unit area. For example, the display might be exposed to the light until the light source emits the specified dose or until the display receives a specified dose (e.g., >10 joules/square centimeter, or some other value).

In some configurations, the time it takes to reach the desired dose may depend in part on how far the display is located from the light source. For example, when the display is located nearer the light source, the specified dose may be reached sooner since the intensity of the light is greater closer to the light source. In some configurations, the display is positioned such that it receives a peak intensity of about 38 milliwatts (mW) per square centimeter (sq.cm.) of light emitted by the light source. Other peak intensity values might be used, such as 125 mW/sq.cm, 100 mW/sq.cm, 75 mW/sq.cm., 50 mW/sq.cm., and the like.

In other configurations, instead of exposing the display to an external light source, a light source that is part of the electronic device may be used to photobleach the display. For example, the display light of the electronic device used to illuminate the display may be turned on for some period of time (e.g., a "burn-in" period). According to some examples, the display light is turned on at full power (e.g., maximum brightness) for the duration of the burn-in period. The burn-in period might be eight hours, eighteen hours, or some other value. In some configurations, two displays might be stacked together with the displays facing each other such that the light of one display is received by the other display. In yet other configurations, the display might be subjected to the burn-in period as well as the dosing received from the light emitted by the light source.

In some examples, it has been found that a yellow gradient exhibited by some displays may be reduced by approximately 50% after exposure of the display to the light emitted by the light source and reduced by approximately 40% using the burn-in period. The photobleaching obtained by the burn-in period and/or the exposure to the light source might reduce the return rate of electronic devices since the display may not exhibit the unwanted color gradients. Additional examples related to photobleaching displays to reduce color gradients are described below. The techniques discussed herein may be implemented in many different ways, by many different systems. Various representative implementations are provided below with reference to the figures.

FIG. 1 is a system diagram showing an illustrative environment 100 for photobleaching displays to reduce color gradients. The environment 100 includes a computing device 102 that may be utilized by a user to expose one or more displays, such as the displays 104A-104C, to the light emitted by one or more of the light sources 106A-106D. The computing device 102 may be a desktop computing device, a smartphone, a tablet, or any other computing device 102 capable of performing the technologies described herein. In some examples, the computing device 102 may not be utilized. For example, a user might turn on and turn off the light sources 106A-106D manually. The computing device 102 illustrated in FIG. 1 might execute a number of software modules in order to perform operations described herein. The modules may consist of a number of subcomponents executing on one or more computing devices.

As briefly discussed, above some displays 104 may include color gradients that are distracting to a user. For example, the displays 104A-104C may appear to be more "yellow" in one portion of the display as compared to another portion of the display. The unwanted color gradients may be a reason a user returns the electronic device for replacement. In some instances, a portion of the display 104 that has larger variations in color (e.g., appears more uneven or yellow, or some other color) is positioned to receive the peak intensity of the light emitted by one or more of the light sources 106A-106D. In this way, the portion of the display 104 that exhibits the most noticeable color differences is exposed to the peak light intensity from the light sources 106A-106D. According to some examples, the top edges of the displays 104A-104C are positioned nearer the position of the peak intensity output by the light sources 106A-106D as compared to the bottom edges of the displays 104A-104C.

According to some configurations, display data 108 relating to one or more of the displays 104A-104C may be stored in the data store 110. For instance, the display data 108 may include color measurements for one or more of the displays 104A-104C (or an exemplary display). The display data 108 may include color measurements for different points on one or more of the displays 104A-104C. In some examples, a display might be divided into a grid of points (e.g., 8, 16, 32, 64, or 128 points equally spaced). These color measurements might be determined using a camera (not shown) or some other color measurement device.

The computing device 102 and/or a user might utilize the display data 108 to determine one or more portions of the display 104 where the deltas between the color values between the different measurement points on the display are the largest. For example, the deltas between the measurement points for a display might be higher near an edge of the screen that are farther away from the display lights (See FIG. 7) used to illuminate the display 104. As briefly discussed, the measurement points on the display 104 may be a grid of points that are evenly dispersed throughout the display. There may be any number of points on the display that are measured for a color value (e.g., 16, 32, 64, or 128). The more points on the display that are measured for one or more color values may result in a better determination of the color gradients exhibited by the display 104.

After determining the portions of the display that exhibit the unwanted color gradients (e.g., the portion of the display that is associated with the largest deltas), the displays 104A-104C may be positioned underneath one or more light sources 106. In some configurations, the displays 104A-104C are positioned such that the peak intensity of the light emitted by one or more of the light sources 106A-106D is received at the portion of the display that is associated with the largest deltas. According to some examples, each display 104 is placed below a separate light source 106A-106C. In other configurations, more than one display, such as the displays 104A-104C, are positioned under a single light source 106D. According to some configurations, the displays 104 might move along a conveyor belt to be exposed to the light emitted by one or more of the lamps 106A-106D, as indicated by dashed array 122A. Using more than one light source 106 might better control the amount of light energy that is received by a display 104. After the displays 104A-104C are exposed to light emitted by one or more of the lights sources 106A-106D for some period of time, the deltas of the color differences between the points on the display may decrease (See FIG. 4 for an example reduction of color gradients).

In some configurations, to reduce the color gradient (e.g., the yellow color gradient) exhibited by a display 104, the display 104 is exposed to visible light and near-visible light. For example, the light sources 106A-106D may be configured to emit light that includes wavelengths that are above about 310 nm.

In some configurations, the light sources 106 may be a lamp, such as a mercury vapor bulb, that is filtered such that the device receives wavelengths that are above about 310 nm. For example, a lamp may be filtered to create UV light and visible light that includes the wavelengths between about 310 nm and 700 nm. A glass sheet 112, or some other filter, may be placed between the lamp and the display, to filter the light emitted by a light source 106, such as a lamp. As illustrated, the glass sheet 112 is placed between the light source 106D and the displays 104A-104C. In other examples, one or more glass sheets 112 might be placed between the light sources 106A-106D and the displays 104A-104C. In other examples, the light source 106 might produce the desired wavelengths (e.g., 310 nm-700 nm) without filtering. For example, one or more light emitting diodes (LED) might be used to emit one or more wavelengths. In some configurations, the filter might limit the amount of light emitted to all or a portion of the display. For example, the filter might allow all of the light from the lamp 106D to pass through to a first portion of a display 104 and limit the amount of light from lamp 106D to pass through to a second portion of the display 104.

According to some configurations, a light manager 114 may use the display data 108 to determine one or more settings 116 that are associated with photobleaching the displays 104. For example, the light manager 114 may determine the locations on the displays 104 that have the largest deltas between the color measurements. The light manager 114 may set one or more of the settings 116 within the data store 110 to indicate positioning data for the displays 104 as well as an amount of light energy to apply to the displays 104. For instance, in response to the light manager 114 determining that the portion of the display 104 near the top edge has the largest yellow deltas, the top portion of the displays 104 might be positioned to receive more light energy from the light sources 106A-106D as compared to the other portions of the display 104.

According to some configurations, the display 104 is exposed to the light emitted by the one or more light sources 106A-106D until the portions of the display 104 that are being photobleached receive a specified dose of the light energy. For example, the light manager 114 may instruct the light controller 118 to expose the displays 104A-104C until the dose specified by the settings 116 is received. According to some examples, the settings might specify for the displays 104 to receive some specified amount of energy (e.g., >10 joules/square centimeter, or some other value).

The time it takes for a display 104 to receive the desired dose may depend on how far the display 104 is located from the light source 106. For example, when a display 104 is located nearer a light source 106, the specified dose will be reached sooner since the intensity of the light is greater closer to the light source 106. In some configurations, the display 104 is positioned such that it receives a peak intensity of about 38 milliwatts (mW) per square centimeter. Other peak intensity values might be used (e.g., 75 mW/sq. cm.).

In other configurations, instead of exposing the displays 104A-104C to an external light source, a light source that is part of an electronic device, such as the electronic device 120A or electronic device 120B, is used to photobleach the display 104. For instance, one or more display lights is turned on to illuminate the display for some period of time (e.g., a "burn-in" period). According to some examples, the display lights are turned on at or near full power (e.g., maximum brightness or near maximum brightness) for the burn-in period. The burn-in period might be eight hours, eighteen hours, or some other value. Generally, the longer the burn-in period, the more photobleaching that occurs. In some cases, two displays 104 might be stacked together with the displays facing each other such that the light of one display is received by the other display (not shown). In yet other configurations, a display, such as the display 104A, might be subject to the burn-in period using the display lights as well as the dosing received from the light source 106.

According to some examples, one or more of the displays 104A-104C may include the use of a light guide sheet (See 712 of FIG. 7), which may be referred to herein as a "light guide." The light guide is used to disperse light throughout the display 104. Generally, the light guide 712 is an optical component that has slits or grooves as part of its structure. In some examples, the light guide may be a separate piece of the assembly. In other examples, the light guide may be integrated into the cover of the display.

The light guide may be a separate component that is adhered to the display using an adhesive. In some examples, the display 104C including the adhered light guide may be exposed to the light source 106C before the display 104C is included in an electronic device. For example, after the adhesive is applied to the light guide, the display 104C may be exposed to the light emitted by the light source 106C either before the adhesive is cured, after the adhesive is cured, or possibly during the time the adhesive is cured. In some cases, the adhesive might be cured using a lamp that may also be configured to emit the wavelengths selected for photobleaching. In yet other examples, a light guide might be exposed to a light source before the light guide is adhered to the display 104C. More details for photobleaching a display 104 are provided below.

Figure 2:
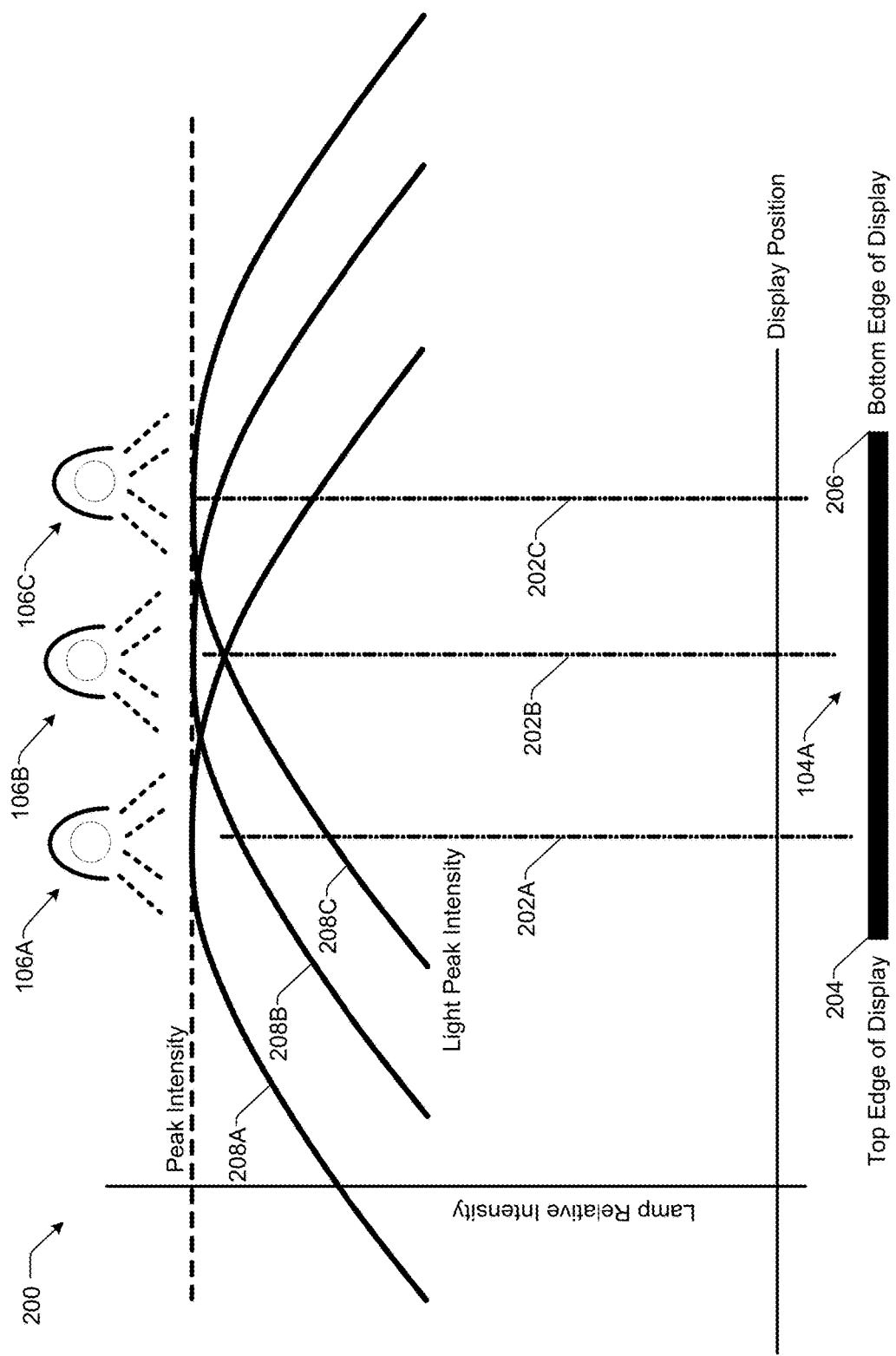
FIG. 2 is a diagram that shows an example light intensity distribution at the surface of a display.

FIG. 2 is a diagram that shows an example light intensity distribution at the surface of a display 104A. A graph 200 show a lamp relative intensity for three different lamps 106A-106C along the y-axis and a display position along the x-axis. As illustrated, the light source 106A is generating a light peak intensity at line 202A that is directed at the top surface of the display 104A near the top edge 204 of the display 104A. The light source 106B is generating a light peak intensity at line 202B that is directed at the middle of the display 104A, and the light source 106C is generating a light peak intensity at line 202C that is directed at the bottom portion of the display 104A.

As discussed above, the position of the display 104A underneath the light sources 106A-106C might be determined based on the deltas of the color measurements on the display, or a similar type of display. Positioning the peak intensity 202 of the output of the light source 106A may assist in reducing the color gradients within the most affected regions of the display. Other portions of the display 104A that are not as affected by the color gradients may receive less light energy depending on what light sources 106 are turned on. For example, when light sources 106B and 106C are turned off, and light source 106A is turned on, then the top portion of the display 104A receives more light as compared to the middle or bottom portions of the display. Similarly, when light sources 106A and 106B are turned off, and light source 106C is turned on, then the bottom portion of the display 104A receives more light as compared to the middle or top portions of the display. In other examples, the light distribution across the surface of the display might be more uniformly applied (e.g. each of the light sources 106A-106C turned on).

Figure 3:
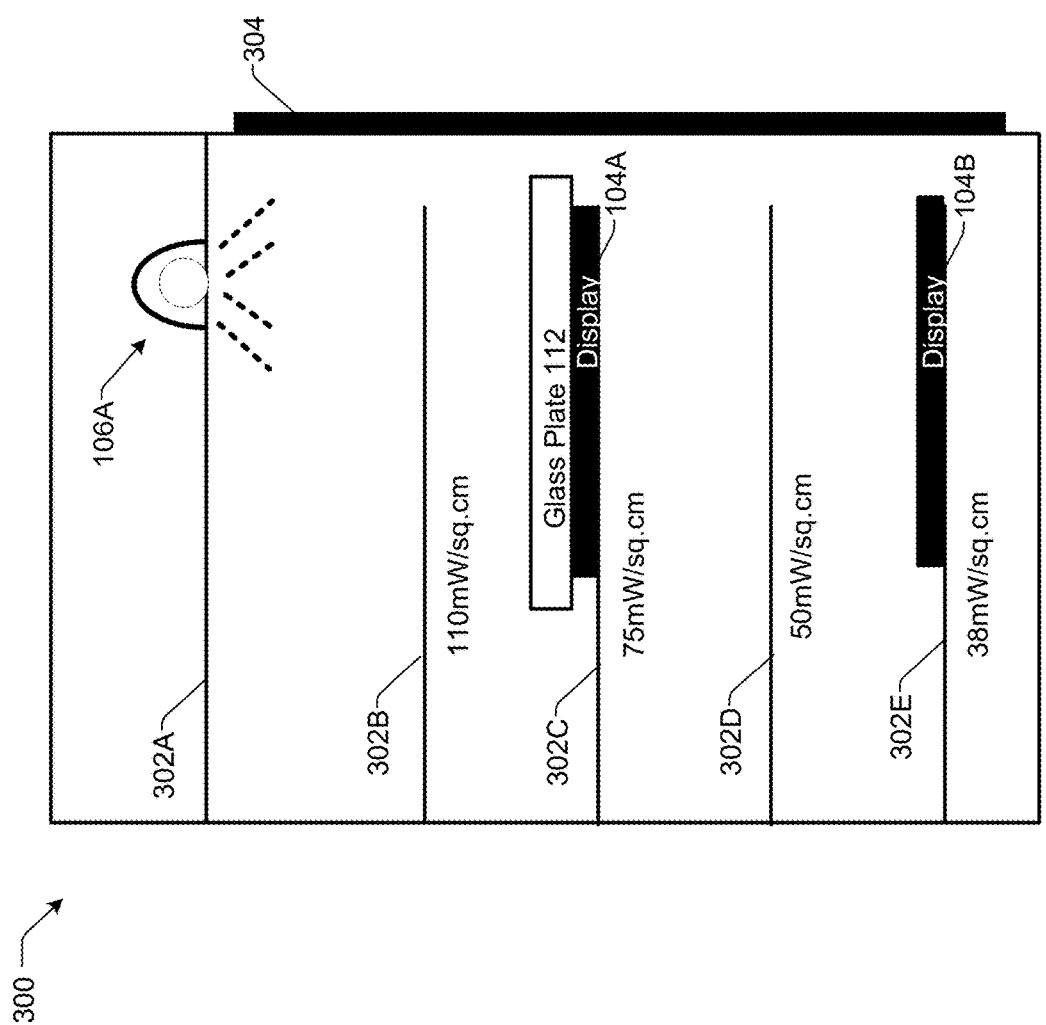
FIG. 3 is a block diagram that shows an example chamber that may be used to photobleach one or more displays.

FIG. 3 is a block diagram that shows an example chamber 300 that may be used to photobleach one or more displays 104. As illustrated in FIG. 3, the chamber 300 includes the light source 106A that is positioned on a top rack 302 of the chamber 300. As discussed above, the light source 106A may be configured to emit visible light and near-visible light in wavelengths that range between about 310 nm and 700 nm. In other configurations, the light source 106A may be configured to emit a wavelength of a particular wavelength.

The chamber 300 illustrates different rack positions 302B-302E that may be used to hold one or more displays, such as the display 104A or the display 104B for photobleaching to reduce the color gradients. While four rack positions 302B-302E are illustrated for holding displays 104, the chamber 300 may include fewer or more rack positions. As discussed above, the farther the display 104 is located from the light source 106A, the less light energy that is received by the display 104.

For purposes of explanation, and not intended to be limiting, the first rack position 302B might be located to receive a peak intensity of about 110 mW/sq. cm from the light source 106A. The second rack position 302C might be located to receive a peak intensity of about 75 mW/sq. cm from the light source 106A. The third rack position 302D might be located to receive a peak intensity of about 50 mW/sq. cm from the light source 106A. The fourth rack position 302E might be located to receive a peak intensity of about 38 mW/sq. cm from the light source 106A.

In some configurations, the displays 104 are located on a rack at the fourth rack location 302E such that the display 104B receives a peak intensity of about approximately 38 mW/sq. cm. One or more displays, such as the display 104A, might be located at another rack location, such as the second rack location 302C during photobleaching. In order to place, position, or remove a display 104 from the chamber 300, the user might open a door 304. According to some configurations, the chamber 300 might also be used to cure the adhesive used to adhere the light guide to the display 104.

Figure 4:
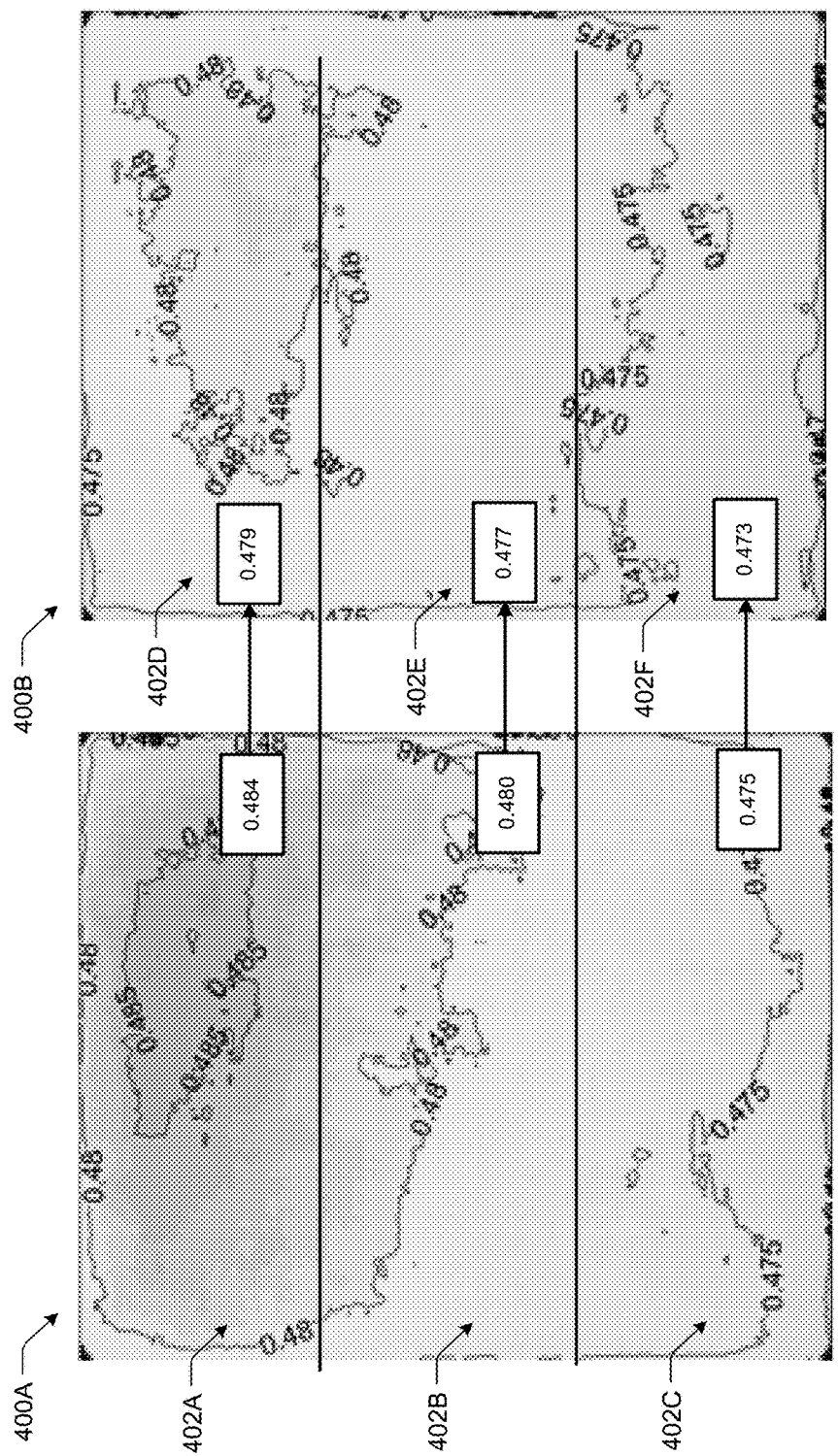
FIG. 4 is a diagram that illustrates a comparison of colors of a display before and after photobleaching.

FIG. 4 is a diagram that illustrates a comparison of colors of a display before and after photobleaching. In the current example, graph 400A illustrates a display of starting average color values (e.g., yellow color values) for a display surface 104 and graph 400B illustrates a display of average color values (e.g., yellow color values) for a display surface 104 after photobleaching using a peak intensity of approximately 38 mW/sq. cm.

In the current example, the Comission Internationale de l'Eclairage (CIE) 1976 (L*, u*, v*) color space (CIELUV) is used to represent the yellow color values. The yellow color values illustrated in FIG. 4 are the v' values as defined the CIELUV color space. Other color spaces may be utilized, such as but not limited to the CIELAB color space, CIEXY color space, the CIEXYZ color space, or the red-green-blue (RGB) color space. The color values may be determined using a color sensor (e.g., a 3-channel RGB sensor) that is placed on the display or over portions of the display. In some configurations, the color values might be determined using a camera.

As discussed above, some portions of a display 104 may appear more "yellow" as compared to other portions of the display. In the current example, the top portion of the display 104, as illustrated by section 402A initially appears more "yellow" as compared to sections 402B and 402C. In some examples, the peak intensity of the light emitted by the light source 106 is directed to the top section 402A. The other sections 402B-402C also receive light energy from the light source 106 during the photobleaching as described herein.

In the current illustrative example, after photobleaching using the peak intensity of approximately 38 mW/sq. cm the average yellow value of each of the different portions is reduced. The most significant change of the color gradients is within the top portion 402D of the display 104 where the average yellow color value changed from 0.484 to 0.479. The average yellow color value of the middle portion 402E of the display 104 changed from 0.480 to 0.477 after being exposed for some duration or some dosing level. The average yellow color value of the bottom portion 402F of the display 104 changed from 0.475 to 0.473 after the photobleaching. As can be seen by referring to graph 400A and graph 400B the average yellow color values for each portion of the display 104 are closer together (e.g., within 0.006) after photobleaching as compared to before the photobleaching (within 0.009).

The chemistry that creates the "yellow" color might be due to an interaction between light guide lacquer and silicone adhesive that may be placed underneath the light guide and may be photo-bleached. The photobleaching may occur by transforming the oxidized amine molecules from the light guide lacquer to an alternate chemistry, which exhibits non-yellow color. In some examples, the wavelengths of the photons exposed appears to be from near UV to the visible spectrum.

Figure 5:
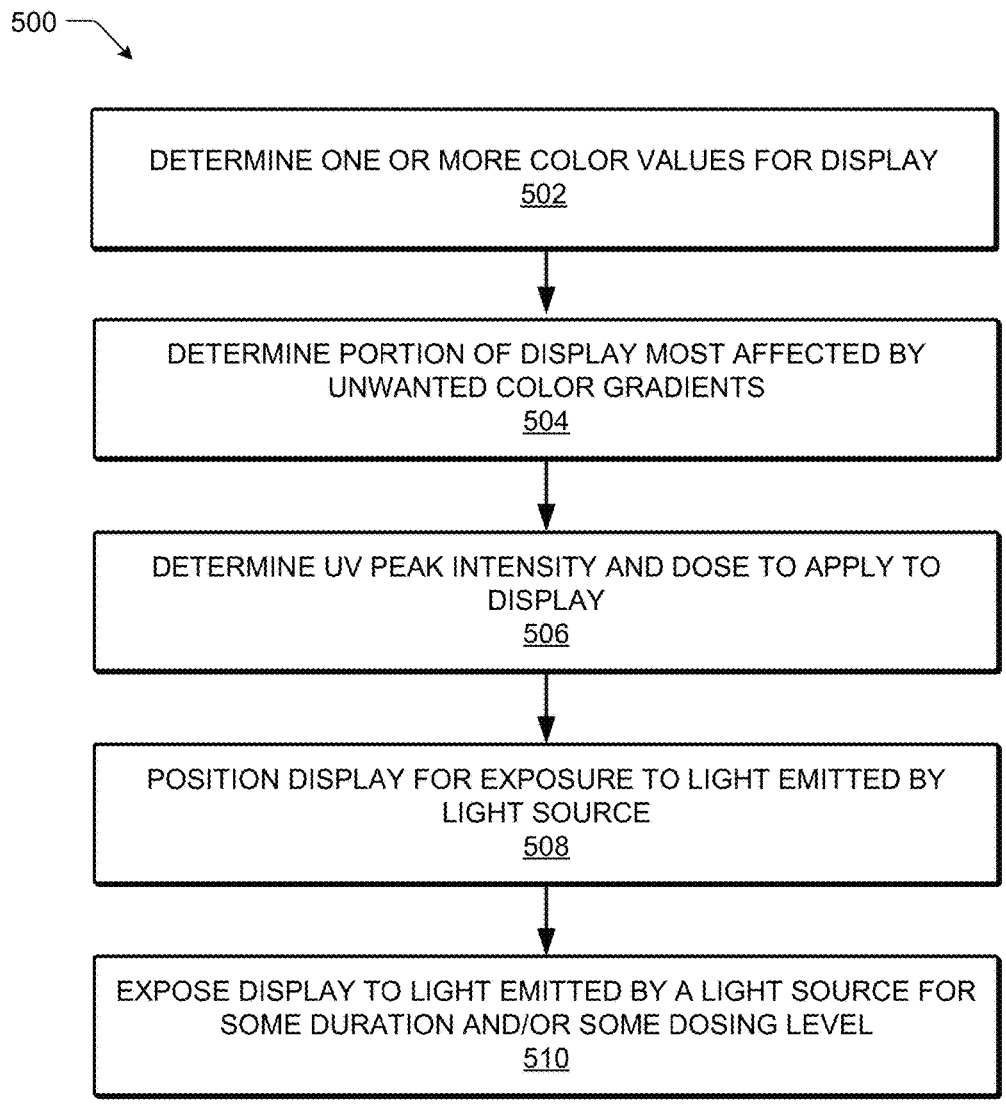
FIG. 5 is an example flow diagram showing an illustrative process for performing photobleaching of a display to mitigate color gradients.
Figure 6:
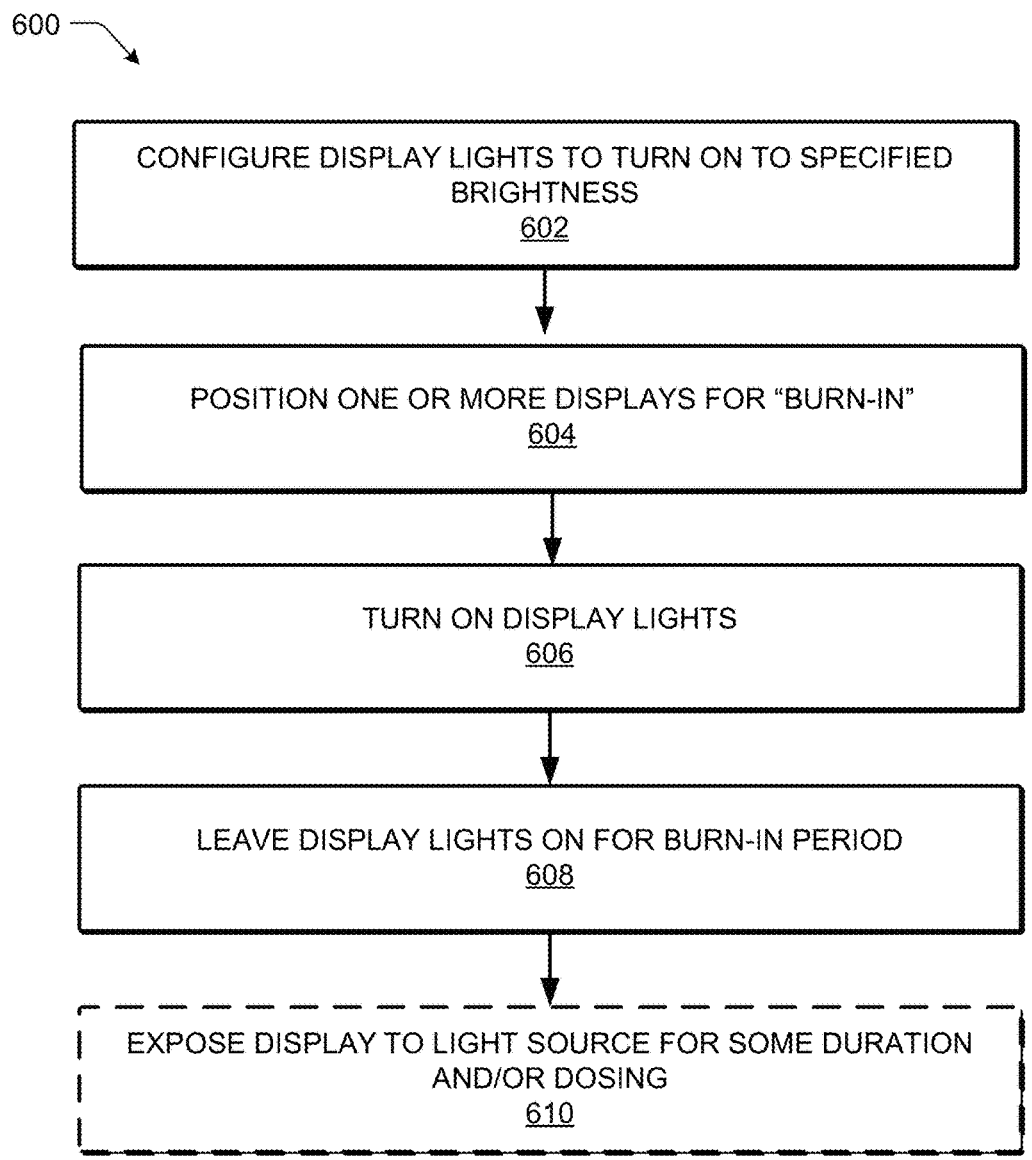
FIG. 6 is an example flow diagram showing an illustrative process for using a burn-in mechanism to photobleach a display.

FIGS. 5 and 6 provide example flow diagrams illustrating example processes for implementing the photobleaching as described above. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is an example flow diagram showing an illustrative process 500 for performing photobleaching of a display to mitigate color gradients. In this example, the computing device 102A might be used to control one or more light sources 106A-106D that are used during the photobleaching.

At 502, one or more color values may determined for a display 104. The display might be used with an electronic reader, or some other type of computing device. As discussed above, in some examples, yellow color values for different locations on the display 104 are determined. Other color values might also be determined (e.g., white). In some configurations, the light manager 114 may instruct a camera, or some other type of color sensor, to obtain the color values. The color values may be stored in the display data 108 within data store 110, or stored in some other location.

At 504, a determination is made as to what portion of the display is most affected by unwanted color gradients. As discussed above, one or more portions of the display 104 might exhibit more unwanted color (e.g., yellow) and have a higher color gradient as compared to other portions. In some examples, the light manager 114 might utilize the color values determined at operation 502 to identify the portion of the display that is the most affected by the display of the unwanted color.

At 506, a determination is made as to what light peak intensity to apply to the display 104 and what dose to apply to the display 104. As discussed above, the light peak intensity may be adjusted to different values. In some examples, the light peak intensity is specified to be about 38 mW/sq. cm and the light emitted by the light source 106 is received by the display 104 until a dose between about 10-20 joules/sq.cm has been received by the display. Generally, the longer the display 104 is exposed to the light emitted by the light source 106, the more photobleaching occurs.

At 508, the display 104 is positioned for exposure to the light emitted by the light source 106. As discussed above, display 104 may be positioned some distance from the light source 106A such that the display receives a specified peak intensity. As also discussed above, the display 104 may be positioned such that the portion of the display that exhibits the most unwanted color (e.g., largest color gradient) receives the peak intensity.

At 510, the display is exposed to the light emitted from the light source 106. As discussed above, the light manager 114 may instruct the light controller 118 to turn on a light source 106 for a specified duration to reach the desired dosing level.

FIG. 6 is an example flow diagram showing an illustrative process 600 for using a burn-in mechanism to photobleach a display. The process 600 might be performed by a user, by the computing device 102, or by some other component or computing device.

At 602, the electronic device including the display is configured such that the display lights used to illuminate the display 104 turn on at a specified brightness when instructed. As discussed above, the electronic device might be placed into a diagnosis mode and the display lights (e.g., one or more LEDs) configured to turn on to a maximum or near maximum brightness level.

At 604, one or more displays are positioned for "burn-in." As discussed above, the displays might be placed on a rack and/or two displays might be stacked on top of each other such that each display surface faces each other. In this way, when the display lights are turned on, each display 104 receives light from the other display.

At 606, the display lights are turned on. As discussed above, the display lights might be turned on to a maximum or near-maximum value. In some configurations, the light manager 114 may instruct the display lights to turn on.

At 608, the display lights are left on for some duration. As discussed above, the display lights are turned on at full power for eight hours, eighteen hours, or some other value. Generally, the longer the burn-in period, the more photobleaching of the display that occurs.

At 610, the display 104 may be exposed to the light source as described above and in reference to FIG. 5. As discussed above, a display might be subject to the burn-in period using the display lights as well as the dosing received from the light source 106.

Figure 7A:
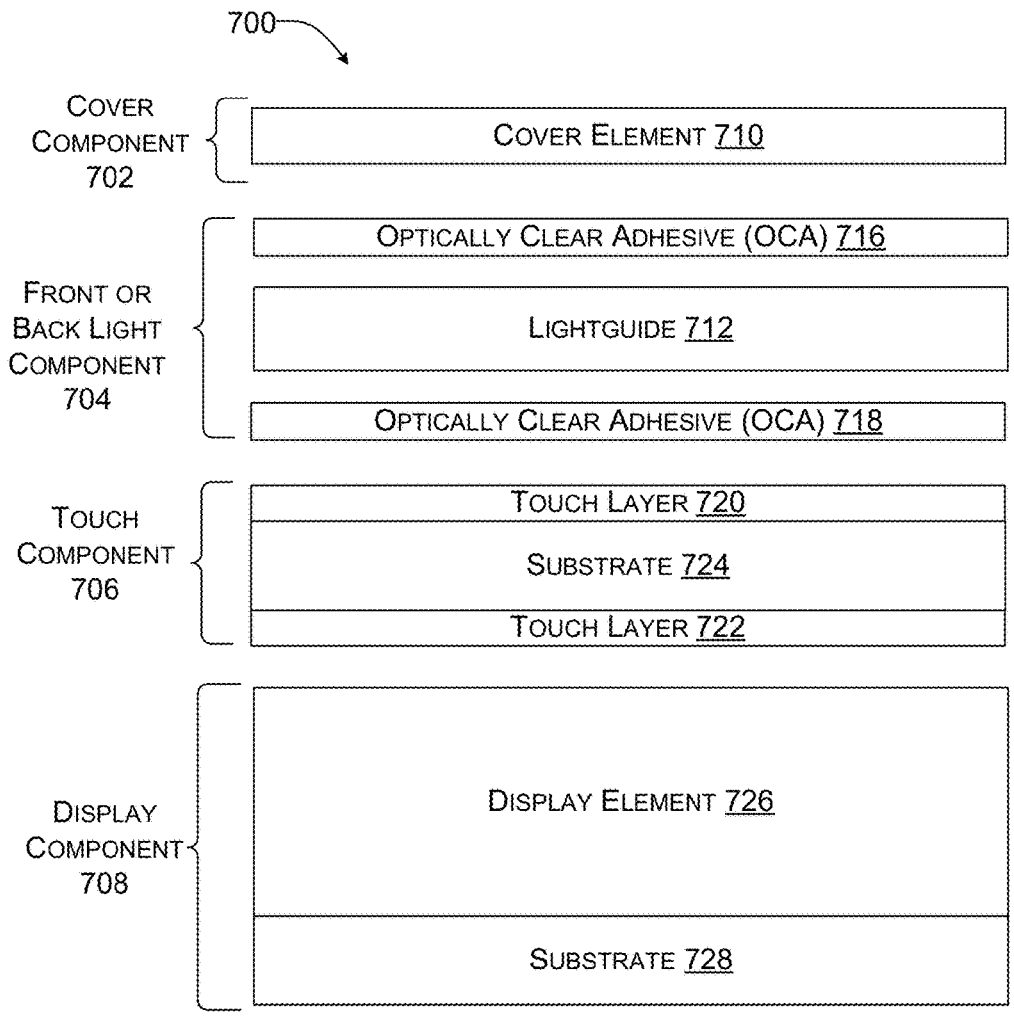
FIG. 7A illustrates a cross-section of a display stack.
Figure 7B:
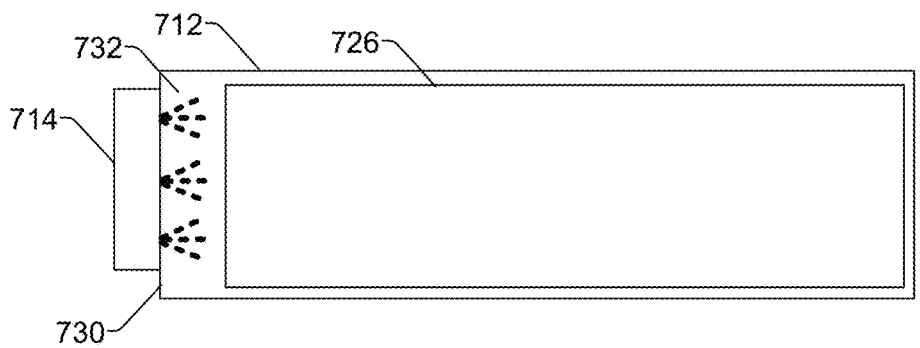
FIG. 7B illustrates a illustrates a top view of the display stack.

FIG. 7A illustrates a cross-section of a display stack 700, while FIG. 7B illustrates a top view of the display stack 700, according to some examples. In some examples, the display stack 700 may a cover component 702, a front or back light component 704, a touch layer 706, and a display component 708. The cover component 702 may be formed from various layers, such as an anti-fingerprint coating (not shown) disposed atop a cover element 710.

In the illustrated example, the front or back light component 704 includes a light guide 712 connected to a display light, such as a light source 714. The light guide 712 is surrounded on the top and bottom by a layer of optically clear adhesive 716 and 718. The light guide 712 may include a substrate (not shown) formed from a transparent thermoplastic, a layer of lacquer and multiple grating elements that function to propagate light from the light source 714 towards the top surface of the display stack 700, thus illuminating the content presented on the display.

According to some configurations, the light source 714 may be connected to a flexible printed circuit (FPC) (not shown) to control the quality and volume of light generated. In some instances, the light source (e.g., one or more LEDs) may connect to the FPC via one of the optically clear adhesive layers 716 or 718. For example, the FPC may be connected to the light source 714 via a solid strip of solid optical clear adhesive or the like. The FPC may also be connected to the light guide 712 via the optically clear adhesive. In some instances, the FPC may include a light-diffusing refractive coating (e.g., in the form of a white matte finish), which may help to diffuse and reflect light from the light source and, hence, increase the uniformity of the light across the front of the display.

In some cases, a touch sensor or touch component 706 includes one or more touch layers 720 and 722 (e.g., rows and/or columns that form a grid or diamond shape) applied to one or more surfaces of a substrate 724 coupled to a touch controller (not shown). For instance, in the illustrated example, the touch layer 720 (e.g., the rows) is applied to the top surface of the substrate 724 and the touch layer 722 (e.g., the columns) is applied to the bottom surface of the substrate 724 or vice versa. In some particular implementations, the touch component 706 may include a single layer multi-touch pattern (e.g., both the rows and columns) applied to a single side of the substrate 726.

In the illustrated example, the touch component 706 resides atop the display component 708. The display component 708 includes a display element 726 arranged atop a substrate 728. For example, the display element 726 and a corresponding display controller (not shown) may cause the display stack to present content to user via one or more image producing technologies. In various examples, the display element 726 may include an active display such as a liquid crystal display (LCD), a plasma display, a light emitting diode (LED) display, an organic light emitting diode (OLED) display, and so forth. In some examples, the display element 726 may include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In still other examples, the display element 726 may include a reflective display, such as an electronic paper display, a reflective liquid crystal display, or the like. For example, the display element 726 may include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, among others. Electronic paper displays represent an array of display technologies that can mimic the look of ordinary ink on paper. In contrast to backlit displays, electronic paper displays typically reflect light, much as ordinary paper does. Accordingly, implementations herein are not limited to any particular display technology.

FIG. 7B illustrates a top view of the display stack 700. As previously discussed, the display stack 700 may also include the light source 712 at or near an end-face 730 of the light guide 712 to inject light into the light guide and to provide the light to the display element 726. The light source 714 may comprise one or more individual sources, such as LEDs, which may be located at one or more locations along a periphery of the light guide 712. As denoted by arrows 734, light generated by the light source 712 may diverge upon and after entering light guide 712, which may have a relatively large area as compared to its thickness (e.g., sheet-like). Via internal reflection, the light can spread over substantially the entire area of light guide 712 and illuminate the display element 726.

Figure 8:
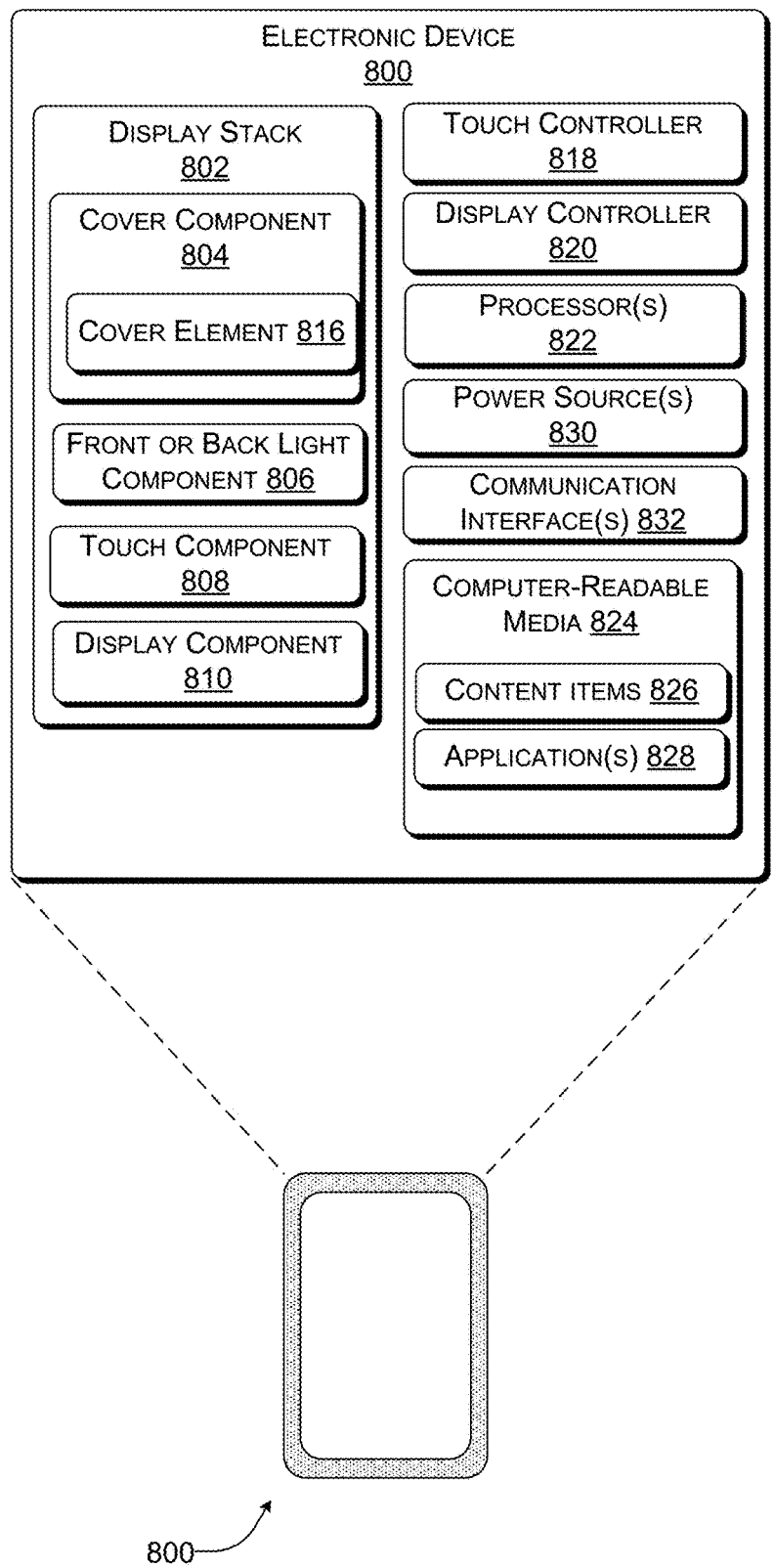
FIG. 8 illustrates an example electronic device including a display stack.

FIG. 8 illustrates an example electronic device 800 including a display stack 802 that has a cover component 804, a front or back light component 806, a touch component 806, and a display component 810. The cover component 804 may include implementations of the cover components described with respect to FIG. 7. The electronic device 800 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 8 illustrates several example components of the electronic device 800, it should be appreciated that the electronic device 800 may also include other conventional components, such as an operating system, system busses, input/output components, and the like.

In some cases, the cover component 804 may be configured to protect the display from damage, such as scratching, chipping, peeling, as well as to provide rigidity and stiffness to the overall electronic device 800.

The electronic device 800 may also include a front or back light component 806 for lighting the display stack 802. The front or back light component 806 may include a light guide and a light source, such as the light guide 712 and the light source 714 illustrated in FIG. 7. The light guide portion can include a substrate including a transparent thermoplastic polymer. For example, the light guide portion may include an acrylic polymer. In one implementation, the light guide portion can include PMMA. In a particular implementation, the light guide portion can include a substrate, a layer of lacquer and multiple grating elements formed in the layer of lacquer. The multiple grating elements may be configured to propagate light to illuminate the display component 810.

Furthermore, the amount of light emitted by the front light component 806 may vary. For instance, upon a user opening a cover of the electronic device 800, the light from the front light or back component 806 may gradually increase to its full illumination. In some instances, the electronic device 800 includes an ambient light sensor and the amount of illumination of the front or back light component 806 may be based at least in part on the amount of ambient light detected by the ambient light sensor. For example, the front or back light component 806 may be dimmer if the ambient light sensor detects relatively little ambient light, such as in a dark room; can be brighter if the ambient light sensor detects ambient light within a particular range; and may be dimmer or turned off if the ambient light sensor detects a relatively large amount of ambient light, such as direct sunlight.

The device 800 may also include a touch component 808 and a touch controller 818. In some instances, at least one touch component 808 resides atop the display component 810 to form a touch-sensitive display (e.g., an electronic paper touch-sensitive display) that is capable of both accepting user input and displaying content corresponding to the input. The touch component 808 may comprise a capacitive touch sensor, a force sensitive resistance (FSR), an interpolating force sensitive resistance (IFSR) sensor, or any other type of touch sensor. In some instances, the touch component 808 is capable of detecting touches as well as determining an amount of pressure or force of these touches.

The display stack 802 also includes a display component 810 and a corresponding display controller 820. For instance, the display stack 802 may include a display component 810 that may present content via one or more image producing technologies. In various examples, the display component 810 may include a reflective display, such as an electronic paper display, a reflective LCD, or the like.

Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other displayed images even when very little or no power is supplied to the display. Some examples of the display component 810 that can be used with the implementations described herein include bi-stable LCDs, MEMS displays, such as interferometric modulator displays, cholesteric displays, electrophoretic displays, electrofluidic pixel displays, electrowetting displays, photonic ink displays, gyricon displays, and the like. In other implementations, or for other types of electronic devices 800, the display component 810 may include an active display such as a LCD, a plasma display, a LED display, an OLED display, and so forth. Accordingly, implementations herein are not limited to any particular display technology.

The electronic device 800 also includes one or more processors 822 and computer-readable media 824. Depending on the configuration of the electronic device 800, the computer-readable media 824 may be an example of tangible non transitory computer storage media and may include volatile and nonvolatile memory and/or removable and non-removable media implemented in any type of technology for storage of information such as computer readable instructions or modules, data structures, program modules or other data. Such computer readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 822.

The computer-readable media 824 may be used to store any number of functional components that are executable on the processors 822, as well as content items 826 and applications 828. Thus, the computer-readable media 824 may include an operating system and a storage database to store one or more content items, such as eBooks, audio books, songs, videos, still images, and the like. The computer-readable media 824 of the electronic device 800 may also store one or more content presentation applications to display content on the device 800. The content presentation applications may be implemented as various applications 828 depending upon the content items 826. For instance, one of the applications 828 may be an electronic book reader application for rendering textual electronic books, an audio player for playing audio books or songs, a video player for playing video, and so forth.

The electronic device 800 may also include one or more power sources 830 for providing power to the display stack 802 and one or more communication interfaces 832 to facilitate communication between one or more networks (such as the Internet or one or more local area networks) and/or directly with one or more devices. The communication interfaces 832 may also facilitate communication between one or more wireless access points, a master device, and/or one or more other computing devices as part of an ad-hoc or home network system. The communication interfaces 832 may support both wired and wireless connection to various networks, such as cellular networks, radio, WiFi networks, short-range or near-field networks (e.g., Bluetooth®), infrared signals, local area networks, wide area networks, the Internet, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method to reduce yellow gradient in an electronic ink display of an electronic reader device, comprising:
    placing the electronic reader device on a rack beneath a lamp, the lamp operative to emit light having wavelengths between about 200 nanometers (nm) and 700 nm, the electronic reader including a light guide that is adhered to the electronic ink display;
    positioning a top of the electronic reader device under a lamp such that a portion of the electronic ink display that exhibits a yellow gradient receives a peak intensity of the light emitted by the lamp, wherein the peak intensity emitted by the lamp is below about 100 milliwatts per square centimeter;
    positioning a glass plate between the lamp and the electronic reader device, the glass plate configured to block wavelengths of the light under about 310 nm;
    turning on the lamp;
    exposing the electronic ink display to the light until a radiant exposure of about twenty joules per square centimeter is output by the lamp that is directed to the electronic ink display, wherein the electronic ink display is exposed to light wavelengths between 310 nm and 700 nm; and
    removing the electronic reader from the rack.

2. The method of claim 1, wherein the portion of the electronic ink display that is exposed to the peak intensity of the lamp corresponds to an extreme of the color gradient of the electronic reader display.

3. The method of claim 1, further comprising setting an output of a display light of the electronic reader at or near a maximum brightness level, the display light used to provide light to the electronic ink display.

4. A method, comprising:
    positioning a display and a light guide for exposure to light emitted by a light source based, at least in part, on a peak light intensity to be received at a top surface of the display, the display exhibiting a color gradient, wherein the display is an electronic display and the light source is external from the display, and wherein the light emitted by the light source has wavelengths above 310 nanometers (nm);
    turning on the light source; and
    exposing the display and the light guide to the light emitted from the light source to reduce the color gradient, wherein exposing the display and the light guide occurs during a cure process that adheres the light guide to the display using an adhesive.

5. The method of claim 4, wherein exposing the display and the light guide further comprises controlling a duration of the exposure of the display and the light guide to the light such that radiant exposure directed to the display by the light source is at least ten joules per square centimeter.

6. The method of claim 4, further comprising positioning a filter between the light source and a top of the display, the filter operative to block wavelengths of light below about 310 nm.

7. The method of claim 4, further comprising positioning a filter between the light source and a top of the display, the filter operative to reduce at least a portion of the light received by the display and the light guide.

8. The method of claim 4, wherein positioning the display and the light guide comprises locating the top surface of the display at a distance from the light source such that the peak light intensity received at the top surface of the display is less than about 75 milliwatts per square centimeter.

9. The method of claim 4, wherein positioning the display and the light guide comprises positioning a portion of the display to receive the peak intensity of the light emitted by the light source, the portion of the display selected based, at least in part, on a color gradient for the portion.

10. The method of claim 4, wherein positioning the display and the light guide comprises positioning a portion of the display to receive the peak intensity of the light emitted by the light source, the portion of the display selected based, at least in part, on a location of a display light configured to light the display.

11. The method of claim 4, wherein the light emitted by the light source includes wavelengths between about 310 nm and 700 nm.

12. The method of claim 4, wherein positioning the display comprises locating a top portion of the display closer to a centerline of the light source.

13. The method of claim 4, wherein exposing the display and the light guide occurs for a period of time based, at least in part, on a distance of the top of the display to the light source.

14. The method of claim 4, further comprising turning on a display light of the display.

* * * * *